Figure 1:
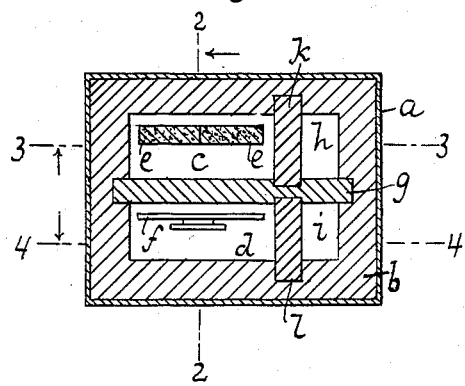

Sept. 22, 1936.   W. MOSCHEL   2,055,359

ELECTROLYTIC PROCESS FOR PRODUCING MAGNESIUM

Original Filed Nov. 23, 1934

INVENTOR
Wilhelm Moschel
BY
ATTORNEYS

Patented Sept. 22, 1936

2,055,359

UNITED STATES PATENT OFFICE 2,055,359

ELECTROLYTIC PROCESS FOR PRODUCING MAGNESIUM

Wilhelm Moschel, Bitterfeld, Germany, assignor, by mesne assignments, to Magnesium Development Corporation, a corporation of Delaware Application June 17, 1930, Serial No. 461,724
In Germany June 20, 1929

6 Claims. (Cl. 204—19)

This invention relates to a process for the dehydration of hydrated magnesium chloride and the subsequent electrolysis of the anhydrous magnesium chloride formed thereby. The apparatus for carrying out the invention has been made the subject matter of United States divisional application Serial No. 754,479, filed November 23, 1934.

It has generally been recognized as essential in the production of magnesium from magnesium chloride by electrolysis of a fused electrolyte that the magnesium chloride consumed in the process should be replaced by magnesium chloride which is dehydrated as thoroughly as possible. On the other hand it is well known to all those skilled in the art that the complete dehydration of the hydrates of magnesium chloride by treating them in a current of desiccated hydrochloric acid—this being the only process hitherto feasible on a technical scale—offers great technical difficulties and is very expensive. An object of the present invention, therefore, is to employ such hydrates of magnesium chloride which are comparatively easily produceable, particularly the hydrate $MgCl_2.2H_2O$, directly for feeding the electrolytic cell and to effect complete dehydration in the electrolytic cell itself.

According to the present invention the hydrate to be treated is introduced into a fused mixture of chlorides, for example, a mixture consisting of

|  | Percent |
|---|---|
| Potassium chloride | 50 |
| Sodium chloride | 40 |
| Magnesium chloride | 10 | in such proportion that the content of the mixture in $MgCl_2$ is not allowed to rise above the proportion prevailing in natural carnallite. By maintaining this ratio it is possible to effect the dehydration of the magnesium chloride hydrates, particularly of the di-hydrate, without any perceptible decomposition of that salt into magnesium oxide and hydrochloric acid.

Example

Into 500 kgs. of a fused mixture of chlorides having a temperature of about 700° C. and containing besides alkali chlorides 12.6 percent of $MgCl_2$ and 1 percent of MgO, 135 kgs. of magnesium chloride di-hydrate consisting of 65.5 percent of $MgCl_2$, 3.9 percent of MgO, balance water, are gradually introduced. The melt is stirred for some time until the evolution of water vapours has ceased. 593 kgs. of an anhydrous melt are thus obtained containing 25.5 percent of $MgCl_2$ and 1.8 percent of MgO. The relatively small increase of the magnesium oxide contents is largely due to the small amounts of magnesium oxide contained in the di-hydrate salt as an impurity and introduced along therewith.

I have further found that it is possible to feed a bath in which electrolytic decomposition of a melt containing anhydrous magnesium chloride is carried out directly with the di-hydrate salt provided the aforesaid conditions are constantly maintained, since the limits of concentration specified in the foregoing example are entirely sufficient for carrying on the electrolysis. According to the present invention, a portion of the electrolyte impoverished in $MgCl_2$ is passed into a separate chamber, preferably forming a subdivision of the electrolytic cell and separated from its main portion by a suitable partition. Into this chamber the di-hydrate is introduced preferably in a preheated condition, at such a rate that the $MgCl_2$ content in the fused product does not exceed 50 percent. Dehydration takes place quite smoothly in the chamber and without any perceptible decomposition of the magnesium chloride. The electrolyte thus replenished with regard to its $MgCl_2$ content is then led back into the main cell.

Figure 2:
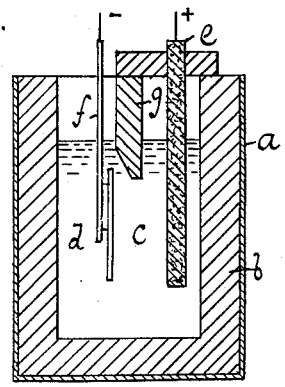

The annexed drawing shows a preferred form of apparatus to be used in connection with the present invention. However, the invention is not limited to this type of apparatus but may be carried out in any device as long as the above described conditions are fulfilled. Figure 1 represents a plan view and Figures 2 to 4 different sections of the device, the broken lines in Figure 1 and their respective numbers indicating the planes in which the different sections are taken.

Figure 3:
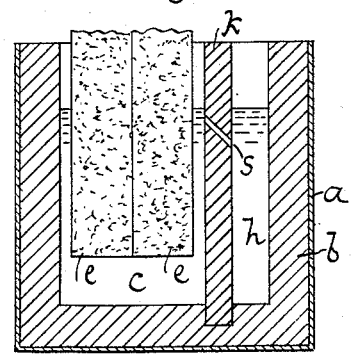
Figure 4:
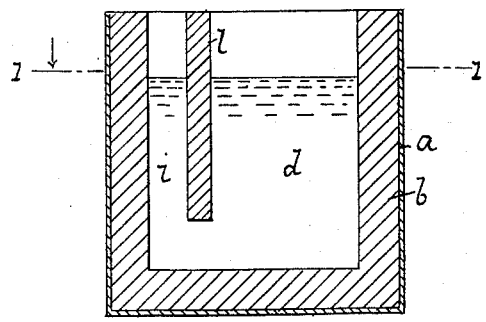

In a trough-shaped container $a$ provided with a lining $b$ of ceramic material, an anode $e$ consisting of two plates of graphite and the iron cathode $f$ are inserted so as to enter into the electrolyte consisting of 50 percent of NaCl, 35 percent of KCl and 15 percent of $MgCl_2$. The container is spanned by a partition $g$ of chamotte which vertically extends just below the level of the electrolyte and divides the cell proper into an anodic chamber $c$ serving for the recovery of chlorine and a cathodic chamber $d$ in which the metal is collected. There are further provided chambers $h$ and $i$ separated from the main cell by partitions $k$ and $l$ of ceramic material. In partition $k$ (comp. Figure 3) extending down to the bottom of the container there is provided a narrow channel $s$ through which, owing to the buoyancy of the chlorine ascending in the anode chamber, some of the electrolyte is caused to enter into the chamber $h$. Into this chamber also the di-hydrate at the rate required by the invention is introduced and immediately gives off its water content by evaporation, whereupon the electrolyte replenished with regard to its magnesium chloride content enters chamber $i$ through a gap provided below partition $g$, and then flows back into the main chamber $d$, through the opening provided below the partition $l$. The continuous circulation of the electrolyte in the manner described is sufficient for maintaining the necessary temperature in chambers $h$ and $i$. However, it is also possible to individually heat these chambers in any known manner, for instance, by means of an alternating current.

The present invention is not limited to the dehydration of the di-hydrate $MgCl_2.2H_2O$, as other hydrates, such as the tetra-hydrate $MgCl_2.4H_2O$, may also be treated in a similar manner. However, the dehydration of other hydrates to a point corresponding to the di-hydrate when carried out in the usual manner, for example, in a reverberatory furnace, offers no difficulties. I therefore preferably employ the di-hydrate as the starting material in my process.

Another form of carrying out the present invention consist in supplying the magnesium chloride to the electrolyte by introducing the hydrates in an entirely separate container into the fused electrolyte which for this purpose must be led out of the cell proper. This mode may be advantageous when a large number of cells must be continually supplied with fresh electrolyte, as it is possible, in this case, to perform the regeneration of the electrolyte of a plurality of cells within a single apparatus.

I claim:

1. The process of electrolytically producing magnesium and chlorine from magnesium chloride which comprises passing a current through a fused bath containing magnesium chloride and alkali metal chlorides and continuously introducing preheated di-hydrated magnesium chloride into a compartment of said bath in communication with the fused chlorides but out of contact with evolved chlorine, said preheated di-hydrated magnesium chloride being introduced in such amounts that the content of the bath in magnesium chloride does not rise above 50 percent, whereby the added chloride is first dehydrated and then decomposed by the current into its constituents.

2. The process as defined in claim 1 wherein the bath is maintained at a temperature of about 700° C.

3. The process of electrolytically producing magnesium and chlorine from magnesium chloride which comprises passing a current through a fused bath formed by adding to a mixture composed of 50 percent of potassium chloride 40 percent of sodium chloride and 10 percent of magnesium chloride, hydrated magnesium chloride to bring the content of the bath in magnesium chloride to about 25 percent and continuously introducing preheated di-hydrated magnesium chloride into a compartment of said bath in communication with the fused chlorides but out of contact with evolved chlorine, to maintain the content of magnesium chloride in the bath substantially constant.

4. The process of continuously electrolytically producing magnesium and chlorine from magnesium chloride in a cell having a plurality of inter-connected compartments, which comprises passing a current through a fused bath containing magnesium chloride and alkali metal chlorides in one compartment of said cell to decompose said magnesium chloride into magnesium and chlorine, causing the evolved chlorine to aid in effecting a transfer of a portion of the bath depleted in magnesium chloride from said compartment into another compartment, adding preheated di-hydrated magnesium chloride to the portion of the bath transferred to said other compartment while maintaining said portion in a fused condition, said preheated di-hydrated magnesium chloride being added in such an amount that the content of magnesium chloride in the final mixture is less than 50 percent, returning the fused mixture to said first compartment and there electrolyzing the same.

5. A continuous electrolytic process for producing magnesium and chlorine from anhydrous magnesium chloride in a cell having a plurality of interconnected compartments, said process comprising passing a current through a fused bath containing anhydrous magnesium chloride and alkali metal chlorides in one compartment thereof to decompose said magnesium chloride into magnesium and chlorine, maintaining said bath at about 700° C., causing the evolved chlorine to aid in effecting a transfer of a portion of the bath depleted in magnesium chloride from said first-mentioned compartment into another compartment, adding preheated di-hydrated magnesium chloride to the portion of the bath transferred to the second-mentioned compartment, said preheated di-hydrated magnesium chloride being added in such an amount that the magnesium chloride content of the final mixture is less than 50 percent, and returning the fused mixture to the first-mentioned compartment and there electrolyzing the same.

6. The process of electrolytically producing magnesium and chlorine from magnesium chloride which comprises passing an electric current through a cell containing a fused bath of magnesium chloride and alkali metal chlorides, continuously introducing di-hydrated magnesium chloride into a compartment within said cell in communication with the fused bath but out of contact with evolved chlorine, and maintaining said di-hydrated magnesium chloride in the compartment to dehydrate the same through the medium of the bath temperature, said di-hydrated magnesium chloride being introduced in such amounts that the content of the cell bath in magnesium chloride does not exceed 50 percent.

WILHELM MOSCHEL.